UNITED STATES PATENT OFFICE.

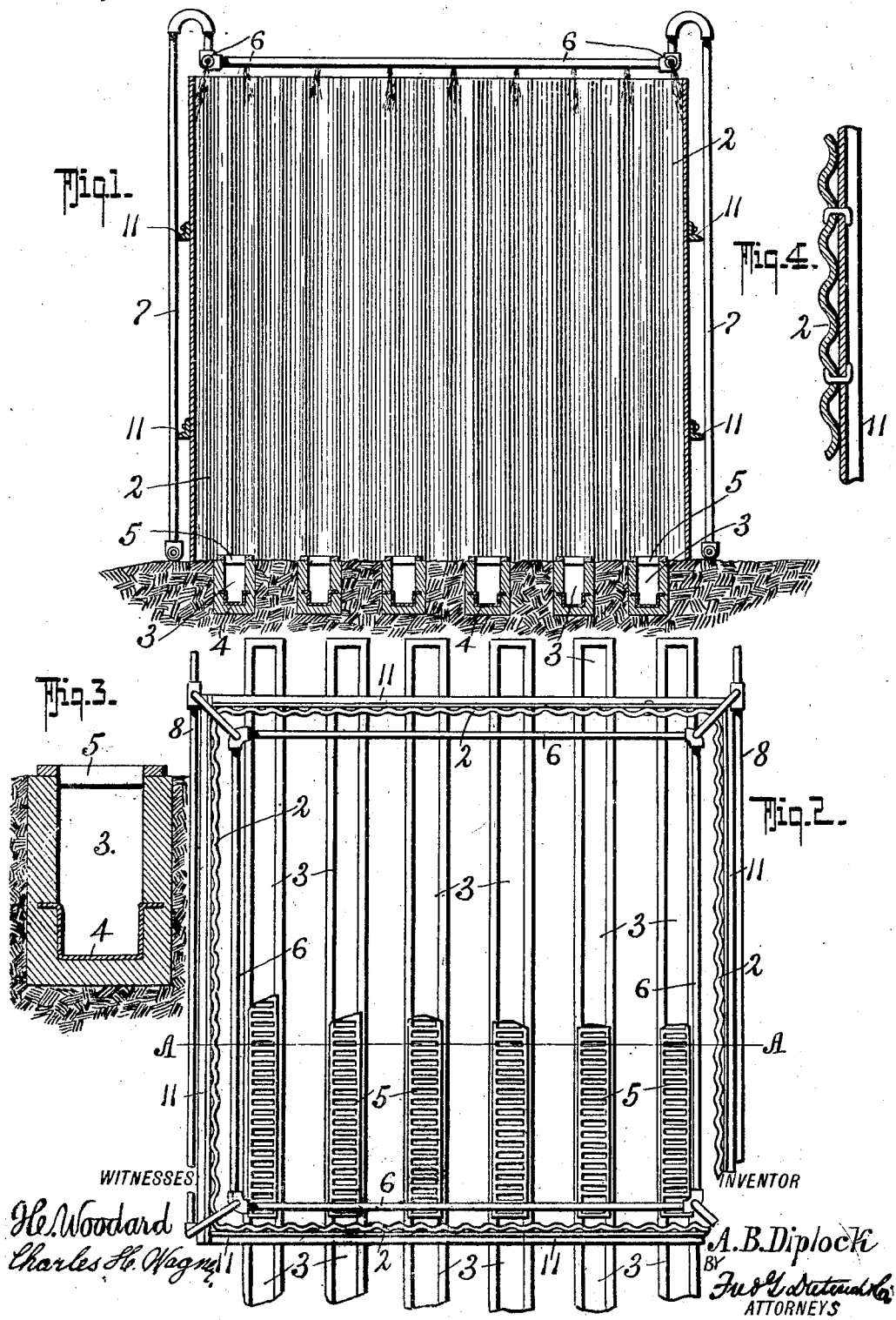

ARTHUR B. DIPLOCK, OF NORTH VANCOUVER, BRITISH COLUMBIA, CANADA.

SAWMILL-REFUSE BURNER.

969,158.  Specification of Letters Patent.  Patented Sept. 6, 1910.

Application filed May 7, 1910. Serial No. 559,892.

*To all whom it may concern:*

Be it known that I, ARTHUR B. DIPLOCK, a citizen of the Dominion of Canada, residing at North Vancouver, in the Province of British Columbia, Canada, have invented a new and useful Sawmill-Refuse Burner, of which the following is a specification.

This invention relates to a burner for the destruction of the wood refuse of a saw mill and is designed to provide a simple, effective and inexpensive means to effect this object. These burners are usually built of brickwork banded or sheathed with iron to hold the brickwork together under the expansion and contraction due to the heat of the furnace. This construction in a large sized burner is quite an expensive one and necessitates a substantial foundation. It is to supply a burner at a comparatively small cost that the construction and novel application which are the subject of this application have been designed.

The invention is particularly described in the following specification, reference being made to the drawings by which it is accompanied, in which:

Figure 1 is a vertical cross section on the line A A in Fig. 2, Fig. 2, is a plan view of the burner, parts being broken away. Fig. 3, an enlarged detail of one of the air trenches with its grate bar, and Fig. 4 is an enlarged detail showing a means whereby the corrugated sheet metal may be connected to their strengthening bars.

The walls 2 of the burner are formed of corrugated sheet iron the corrugations of which are arranged vertically, and these walls are erected on the surface of the ground across which are narrow relatively deep brick lined trenches 3. These trenches are about five feet apart in a thirty foot square burner and extend beyond both walls so, as to afford an ample area for the incoming air draft, which may be increased if found necessary by wing screens extended toward the prevailing winds.

Between the inclosing walls 2 of the burner, the trenches 3 are provided with gratings 5, that will give the air access to the fire and that will prevent the mill refuse, which is delivered into the burner by a conveyer in the usual way, from filling the trenches. The bottoms of these trenches are lined as at 4, see Fig. 3, with sheet metal so that the water may be flushed through them from one side to the other to clear away the ash falling through without scouring the mortar from the brickwork.

Around the upper edges of the corrugated walls 2 is carried a water pipe 6 provided with perforations directed downward and outward upon the inner sides of the walls. This pipe 6 is connected to a water service 8 by a pipe 7 at each corner so that while the burner is in use the walls are kept cool by a spray of water 10 directed on them.

The gist of the invention resides chiefly in the walls of vertically corrugated iron with the water spray by the use of which this construction is rendered available and the narrow grating covered air supply trenches which are made so that the expense of the grating may be kept low.

Corrugated metal is selected to form the walls as it is largely self-supporting and as it enables the water trickling down the inside to pass any slabs of wood which might be lying against the inside, and which with a flat surface would divert the water from contact with the side. The walls may be strengthened by angle irons 11 across the outside of each wall to which irons the corrugated metal of the sides may be secured at intervals.

An exceedingly simple, effective and inexpensive burner is thus provided: The walls 2 of corrugated iron, strengthened where necessary with irons 11, are practically self-supporting and will expand readily with the heat without excessive buckling and are prevented from being overheated by the water spray against them. The vertical corrugations will also prevent slab wood or the like which may be lying against the sides from preventing the cooling water from passing down. The walls, as kept cool in this manner, will last a long time and the trenches may be readily flushed by means of a hose to remove accumulated ash from them.

Having now particularly described my invention and the manner of its use, I hereby declare that what I claim as new and desire to be protected in by Letters Patent is:

1. As a burner or destructor for saw mill refuse, an inclosure walled with corrugated sheet metal, means for delivering water on the walls, and trenches extending across the ground surface which is inclosed by the wall, said trenches being extended laterally beyond the walls.

2. As a means for the purpose specified, a wall inclosure of corrugated sheet metal the corrugations of which are vertically arranged, a water pipe located at the top of the walls said pipe being perforated to deliver a spray against them, trenches formed of brick extending across the surface of the ground which is inclosed by the walls said trenches being extended laterally beyond the walls, and gratings over the trenches within the inclosure.

3. As a means for the purpose specified, a walled inclosure of corrugated sheet metal, means for spraying water against the inner surface of the walls, relatively narrow trenches formed of brick across the bottom of the inclosure and extending laterally beyond its walls the lower part of said trenches being lined with sheet metal.

4. As a means for the purpose specified, a walled inclosure of corrugated sheet metal forming a combustion chamber, metal bars extending across the corrugations on the outside which bars are secured at intervals to the corrugated sheet metal, means for spraying water against the inner surface of the walls and means for delivering air to the ground area within the inclosure.

In testimony whereof I have signed my name to this specification in the presence of two subscribing witnesses.

ARTHUR B. DIPLOCK.

Witnesses:
ROWLAND BRITTAIN,
ALEXANDER SMITH.